June 11, 1968  P. P. POGACAR  3,387,710
ARTICLE FOR USE IN CHROMATOGRAPHIC AND ELECTROPHORETIC
ANALYSIS, SEPARATION, AND THE LIKE
Filed Aug. 16, 1965

Peter Paul POGACAR
INVENTOR.

BY
ATTORNEY 3,387,710
ARTICLE FOR USE IN CHROMATOGRAPHIC
AND ELECTROPHORETIC ANALYSIS, SEPA-
RATION, AND THE LIKE
Peter Paul Pogacar, Philosophenweg 1a,
Heidelberg, Germany
Filed Aug. 16, 1965, Ser. No. 479,898
Claims priority, application Germany, Feb. 27, 1965,
P 24,846
6 Claims. (Cl. 210—94)

ABSTRACT OF THE DISCLOSURE

The article of this invention includes a tubular carrier made of transparent material having a coating on its interior surface of an activated adsorbent. The tubular carrier is sealed to prevent deactivation of the adsorbent by moisture and the like. The air-tight seal at one end may be removable and replaceable to reseal the carrier. The sealed tubular carrier may be evacuated or filled with an inert gas.

Background of the invention

This invention relates to a device for the chromatographic and electrophoretic separation of dissolved substances for analytical, preparative, and diagnostic purposes. In particular, this invention relates to a carrier-adsorbent combination which is highly effective for thin-layer liquid chromatography and electrophoretic separations of substances.

Thin-layer chromatography and thin-layer electrophoresis processes are used, for example, for the separation of dissolved substances, particularly for analytical purposes. In this process a carrier-adsorbent combination is usually formed. So far the adsorbent material has usually been silica gel, alumina, or the like. The adsorbent material is prepared in the form of a paste, if desired with a binding agent, and is applied by means of a special apparatus in a thin layer to the surface of ground glass plates which have been previously cleaned and dried.

The adsorbent layer is then air-dried and activated by heating at temperatures of about 110° C.

In the separation procedure employing this adsorbent layer, the solution containing the substances to be separated is applied with a pipette onto the lower portion of the adsorbent layer. The plate or plates are then placed into a separating chamber with the lower ends thereof immersed in a separation solvent such as butyl alcohol, acetic acid, or the like. The atmosphere in the separating chamber is saturated with the separation solvent. As the separation solvent travels upwardly in the adsorbent layer, the various substance components to be separated travel upward in the adsorbent layer at different speeds. After the lapse of the normal transit time, the individual components arrive at different heights or levels of the plate due to their differing speeds of travel. The various components can then be made visible by spraying the adsorbent layer containing the components with corresponding reagents so that the components can be identified.

The test procedure and general system described above is very reliable, but involves serious complications. It has previously been found necessary to coat each plate with adsorbent individually, and the coated plates must be used for the separation immediately after activation of the adsorbent since the adsorbent becomes rapidly deactivated due to the action of humidity or moisture in the air. Furthermore, the adsorbent coatings are easily damaged, and the coated plates are not suitable for storage or shipment. It has also been noted that the finished chromatograms formed with the use of coated plates tend to fade due to the action of air, and special treatment is necessary to prevent this effect. Although storage of the unused coated plates in an atmosphere free of moisture is possible, such procedures require extensive precautionary measures and additional facilities.

Summary of the invention

It is an object of this invention to provide a device for chromatographic and electrophoretic separations of dissolved substances which comprises a carrier and a coating of an adsorbent material which can be easily stored for long periods of time without deactivation of the adsorbent. The device can be readily shipped and stored without injury to the adsorbent layer. Furthermore, the device of this invention permits storage of chromatograms while protecting the adsorbent layer from air in a simple and highly effective manner.

Further objects and advantages will appear from the description and the embodiments thereof as shown in the accompanying drawing.

Description of the preferred embodiments

Figure 1:
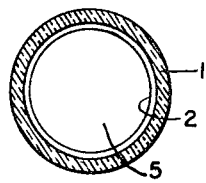
FIG. 1 is a cross-sectional view of a cylindrical embodiment of the device of this invention wherein the tubular carrier consists of glass.

The disadvantages and difficulties encountered with the prior art systems and devices for chromatographic and electrophoretic separations of dissolved substances have been eliminated in the device of this invention. In the device of this invention, the carrier is formed by a tubular body of transparent material, and the adsorbent is applied as a thin layer to the interior surface thereof. The tubular carrier can be sealed in an airtight manner after the adsorbent is activated. The tubular carrier can be sealed at both ends with suitable caps, or the tubular carrier can be closed at one end, and a cap can be applied at the other end to provide an airtight seal. The interior of the carrier tube can be evacuated or filled with an inert gas after activation of the adsorbent. By virtue of the unique structure of the device of this invention, suitable coated carriers for chromatographic separations may be kept on hand for use when desired, and the troublesome preparatory work in the investigation of mixtures of substances is eliminated. Preparation of highly uniform coated carriers on a factory scale is made possible. Moreover, since the tubular carrier can be tightly resealed after use, a reliable storage of thin-layer chromatograms can be attained. The chromatographic device of this invention eliminates the need for the previously employed separating chamber.

The end of the tubular carrier is merely inserted into the separating solvent to provide the desired separation and thus the carrier serves simultaneously as separating chamber. The interior of the carrier, the area of the adsorbent material surface, is rapidly saturated by the separating solvent. Furthermore, as compared with a conventional separating chamber which has a large volume, the degree of saturation of the atmosphere in contact with the adsorbent surface in the device of this invention can be more easily maintained. Also, the so-called "marginal phenomena," an undesirable formation which occurs when flat coated plates are employed, is prevented by the device of this invention.

Referring to the drawing, the hollow tubular body 1 can be made of a transparent material such as glass or transparent plastics such as polyesters, acrylate and methacrylate polymers, polystyrene, etc. The interior of the tubular carrier 1 is coated with an adsorbent layer 2. The tubular body is hollow and can have a cylindrical cross-section, as shown in the figures, or any other configuration desired such as triangular, square, and other polygonal shapes and oval, ellipsoidal, and other curved shapes or combinations thereof.

The adsorbent is applied to the inner wall of the carrier 1 in a conventional manner. For example, a paste of the adsorbent can be sprayed on the inner wall of the tube. The adsorbent coating is then dried and activated by heating. Since storage of the device without impairment of the activated adsorbent is possible with the device of this invention, the adsorbent coating can be applied on a commercial scale in a factory whereby extremely uniform adsorbent layers can be obtained in contrast to the layers previously applied by hand in the laboratories.

Figure 2:
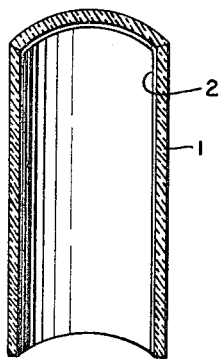
FIG. 2 is a perspective of a longitudinal cross-sectional view of a cylindrical embodiment of the device of this invention.
Figure 3:
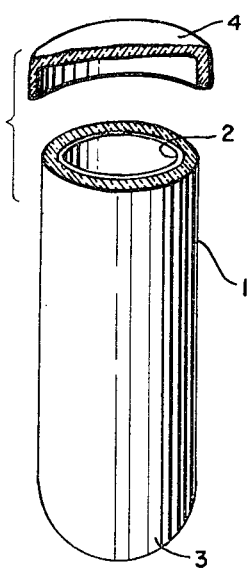
FIG. 3 is a perspective of a sectional view of a cylindrical embodiment of the device of this invention wherein one end of the tube is closed and a cap is provided for sealing the other end thereof.

Sealing of the coated tubular carrier 1 can be provided by several methods. For example, as shown in FIG. 3, the tubular carrier can be closed at one end 3 thereof to form a structure similar to that of a conventional test tube. The other end of the tube can be sealed by means of a suitable cap 4. If a tube 1 is employed which is open at both ends as shown in FIG. 2, closing caps 4 can be applied to the ends of the tube to provide a seal in an air-tight manner as shown in FIG. 3. The interior 5 of the tubular carrier can be evacuated or filled with an inert gas after activation of the absorbent layer.

In use of the device of this invention for liquid chromatography, for example the embodiment shown in FIG. 3, the cap 4 is removed, and the solution containing the substances to be separated is applied pointwise or circumferentially to the adsorbent layer adjacent the end of the tube. The carrier tube 1 is then placed with the open end down into a flat container such as a bowl containing the separating solvent. If the embodiment shown in FIG. 2 is employed, either one or both of the sealing caps may be removed prior to use of the tube. The device of this invention is also suitable for carrying out electrophoretic separations. The embodiment shown in FIG. 2 is particularly suitable for this purpose. For such a procedure, the layer of adsorbent in the areas adjacent the ends of the carrier tube 1 can be merely connected in the electrical circuit, and the adsorbent layer can be impregnated with the electrolyte. Since the exterior of the carrier tube 1 is mechanically resistant, heat formed within the carrier tube during the electrophoresis can be easily removed. For example, a tube or hose can be wound around the exterior of the carrier tube, and cooling fluid can be circulated therethrough at a suitable rate to provide a constant temperature within the carrier tube.

Obviously, many modifications and variations of the invention as hereinabove set forth can be made without departing from the essence and scope thereof, and only such limitations should be applied as are indicated in the appended claims.

I claim:

1. An article of manufacture for use in thin-layer liquid chromatography and thin-layer electrophoretic separations of dissolved substances, comprising; a tubular carrier made of transparent material, said tubular carrier having a coating on its interior surface consisting at least in part of an activated adsorbent and sealing means sealing the ends of said tubular carrier to maintain said adsorbent in its activated state.

2. The articles of claim 1 wherein the interior of the tubular carrier is evacuated.

3. The article of claim 1 wherein the interior of the tubular carrier is filled with an inert gas.

4. The article of claim 1 wherein at least one end of the tubular carrier is sealed with a removable cap.

5. The article of claim 4 wherein the sealing means at one end of said tubular carrier is formed from the material of the tubular carrier.

6. The article of claim 4 wherein said tubular carrier is resealable by replacing said removable cap.

References Cited

UNITED STATES PATENTS

| 2,920,478 | 1/1960 | Golay | 55—197 |
|---|---|---|---|
| 3,307,333 | 3/1967 | Norem et al. | 55—386 |

SAMIH N. ZAHARNA, *Primary Examiner.*